R. C. BURNS.
MEANS FOR PROVIDING A BORDER ON PHOTOGRAPHIC FILMS.
APPLICATION FILED MAR. 14, 1919.
1,335,089.
Patented Mar. 30, 1920.
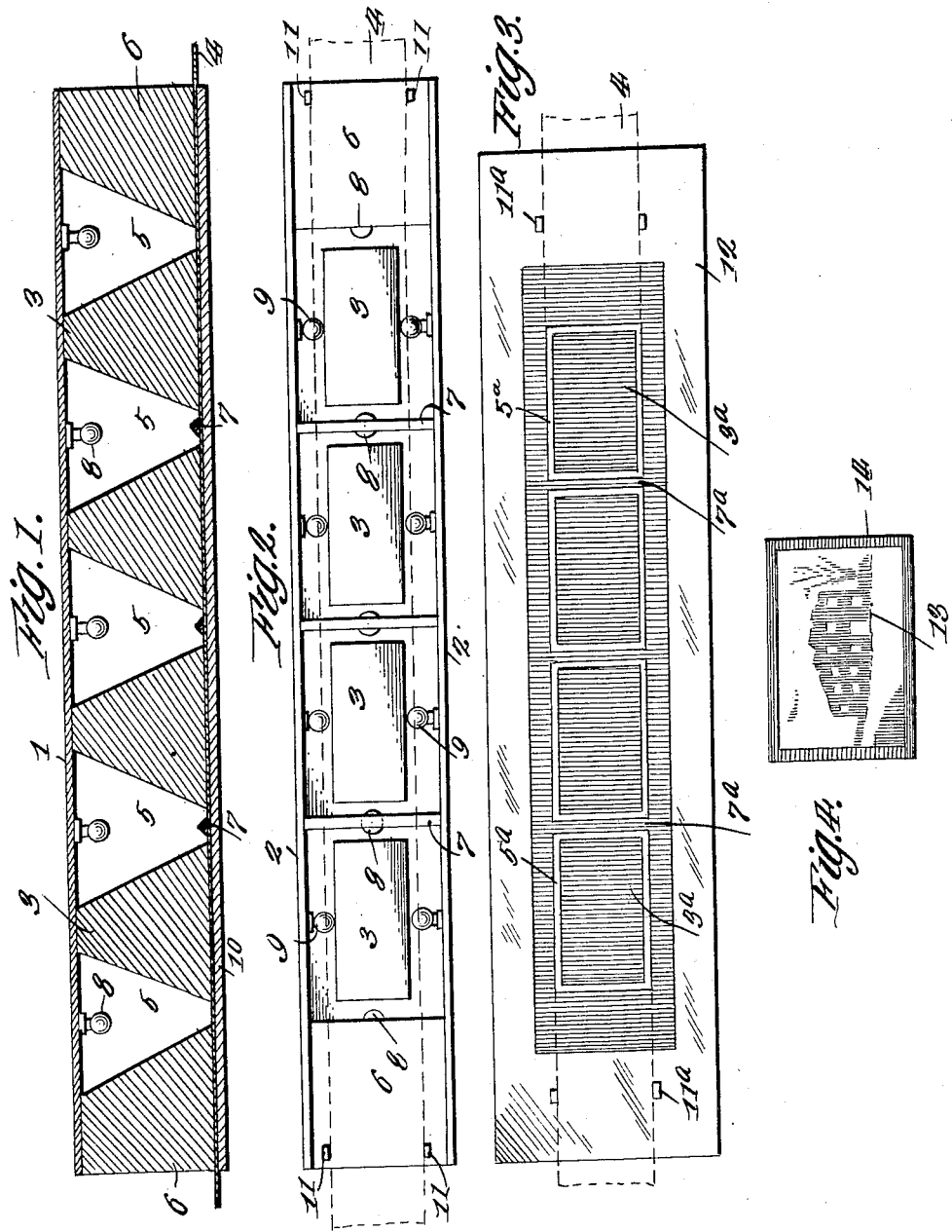
WITNESS:
Guy M. Spring
U. B. Hillyard.
INVENTOR.
Rea Cecil Burns
BY
Richard B. Owen
ATTORNEY.

UNITED STATES PATENT OFFICE.

REA CECIL BURNS, OF CEDARVILLE, OHIO.

MEANS FOR PROVIDING A BORDER ON PHOTOGRAPHIC FILMS.

1,335,089.  Specification of Letters Patent.  Patented Mar. 30, 1920.

Application filed March 14, 1919. Serial No. 282,657.

*To all whom it may concern:*

Be it known that I, REA CECIL BURNS, a citizen of the United States, residing at Cedarville, in the county of Greene and State of Ohio, have invented certain new and useful Improvements in Means for Providing a Border on Photographic Films, of which the following is a specification.

In the art of photography it has been found desirable to provide negatives with borders chiefly because it facilitates the provision of pictures of uniform size. This is particularly the case with flexible negatives consisting of a film which is usually provided in roll form.

In accordance with this invention a film roll may have all the picture spaces bordered at one operation, either before or after exposure as may be found most advantageous, it being preferred however, to provide the border after the pictures have been taken and prior to developing and fixing.

The invention consists of a mask which may be provided in the form of either a cabinet, or a plate including light obstructing members corresponding to the picture spaces and light transmitting spaces coinciding with the border to be produced defining each of the picture spaces.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

In the drawing illustrating applications of the invention,

Figure 1 is a longitudinal section of one form of the invention embodying a cabinet and light producing and light obstructing means.

Fig. 2 is a view of the device inverted or as seen from the bottom side.

Fig. 3 is a plan view of a modification.

Fig. 4 is a detail view of a negative provided with a border in accordance with the invention.

Corresponding and like parts are referred to in the following description and indicated in the several views of the drawing by like reference characters.

The mask or border producing device comprises light obstructing members and light transmitting spaces, the light obstructing members corresponding with the picture spaces of a film and the light transmitting spaces coinciding with the border forming the boundary of each of the picture spaces. The mask may be variously formed as indicated in the drawing either as a cabinet or as a plate.

Figs. 1 and 2 indicate a preferred form of the invention which partakes of the nature of a cabinet since it includes all the parts essential to a complete operation. The mask shown in Figs. 1 and 2 comprises a top 1 and sides 2, the latter being spaced apart a distance depending upon the size of the article and the width of the film to be operated upon. A plurality of members 3 are disposed in the length of the device and are spaced equi-distant from one another and from the sides 2. The members 3 constitute light obstructing elements and their bases are of a size to correspond with the picture spaces of a film 4. The members 3 are oblong and their ends are oppositely inclined to provide spaces 5 which flare upwardly toward the top 1. The members 3 may be of any material or construction. The lower faces of the members 3 are in the same plane so as to obtain a close fit upon the film 4 and prevent any light reaching the picture spaces and thereby insure a sharp outline of border. End pieces 6 are secured between the end portions of the sides 2 and their inner faces incline in conformity to the inclined faces of the members 3. The top 1 engages the upper edges of the sides 2 and the upper faces of the ends 6 and may be attached thereto. The members 3 are carried by the top 1 and may be secured thereto in any manner. In the event of the members 3 consisting of blocks they may be glued to the top 1.

Transverse strips 7 are located at the lower ends of the spaces 5 and their sides are oppositely inclined to insure a sharp outline of border. The lower faces of the strips 7 are in the plane of the lower faces of the members 3 so as to make close contact with the film 4. The spaces at the sides of the strips 7 coincide with the border at the ends of the picture spaces of the film. The strips 7 serve to obstruct the rays of light, hence result in providing well defined lines between the picture spaces which serve as guides when separating the film so that the negatives are of uniform size. Lamps 8 are located in the spaces 5 and are preferably connected to the top 1 and are of the electric type possessing actinic properties which affect the sensitized surface of the film. Other lamps 9 are located in the spaces formed at the sides of the members 3, thereby insuring the formation of a border of sharp outline.

In practice the film 4 to be provided with a border about each picture space is placed upon a flat surface 10 which may consist of a table, desk or other support. The film is extended on the supporting surface 10 and the mask or border producing device is placed upon the film. To insure proper positioning of the mask and film, guides 11 are provided upon the lower faces of the ends 6 and consist of projections which engage the edges of the film, as indicated by the dotted lines in Fig. 2. The film 4 may be extended over the device when the latter is inverted after which the mask and film may be placed upon the supporting surface 10. After the parts are in position the circuit, not shown, including the lamps 8 and 9 is closed and the rays of light striking the exposed portions of the film produce the border thereon in a manner well understood. The portions of the film covered by the light obstructing members 3 and 7 are not affected by the action of the rays of light. After proper exposure the border is produced and this action may be performed either before or after the pictures have been taken. After the film has been exposed for taking pictures, the same is treated in the usual manner for developing and fixing both the border and pictures and after the film has been treated and dried the pictures will be separated by a well defined border which extends around the same, the several pictures being separated by white lines which serve as guides when separating the film to divide the pictures or negatives which will be of uniform size and present a neat appearance, thereby being convenient to handle and enabling the prints to be of uniform size because of the border on the negative.

In the modification shown in Fig. 3 the mask or device comprises a plate 12 which is preferably of glass. Light obstructing members 3ª are provided on one side of the transparent plate 12. The members 3ª are separated by light obstructing portions 7ª which perform the same office as the strips 7 of the form illustrated in Figs. 1 and 2. Spaces 5ª surround the members 3ª and correspond with the border defining each of the picture spaces of the film 4. Suitable guides 11ª are provided at the ends of the plate 12 to enable the film 4 to be properly positioned. The part resulting in the provision of the border spaces 5ª may be of any material so as to obstruct rays of light and may be painted on the plate 12 or consist of sheet material such as paper pasted thereon. In the event of paper being employed portions are cut therefrom corresponding to the border spaces 5ª. When using the form of mask illustrated in Fig. 3 the film is placed upon a supporting surface and the mask is placed thereover and subjected to light which passing through the border spaces 5ª result in forming the border of the picture spaces. It is to be understood that the several operations will be performed in a dark room to avoid any possible injury to the film.

Fig. 4 illustrates a completed negative provided with a picture 13 and a border 14. When the negative is used for printing the pictures will be of uniform size when trimmed to the border line, hence a number of pictures when placed one upon the other will produce a neat pile or package which may be conveniently and readily handled so that any desired picture may be quickly located.

It is the intention to have the picture spaces of the films bordered at the factory during their course of production since such operation may be performed without appreciable cost compared with the resultant advantages.

In practising the invention the mask is interposed between the film and the source of light, the film being held in close contact with the mask by a suitable support. Thus it will be understood that the rays of light may come from any direction, that is, from below, above or at the side and the film support may be of any nature so long as it holds the film close against the mask and forms a stop to prevent the rays of light passing through the film and reacting to spoil the same.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. A mask or border producing device for a film in the photographic art, comprising a cabinet including a line of light obstructing members having opposing walls oppositely inclined to form flaring spaces, light obstructing elements at the contracted ends of the spaces and lamps disposed within said spaces.

2. A mask or border producing device for a film in the photographic art, comprising a cabinet including a top and sides, light obstructing elements disposed between the sides and spaced therefrom and from one another and having their opposing walls oppositely inclined toward the top to form flaring spaces and lamps disposed in the spaces.

3. A mask or border producing device for a film in the photographic art, comprising a cabinet including a top and sides, light obstructing elements disposed between the sides and spaced therefrom and from one another and having their opposing walls oppositely inclined toward the top to form flaring spaces, light obstructing elements extending between the sides and disposed within the contracted ends of the spaces and having their sides oppositely inclined and lamps disposed in the spaces between and at the sides of the light obstructing members.

In testimony whereof I affix my signature.

REA CECIL BURNS.